(12) United States Patent
Seki et al.

(10) Patent No.: US 6,614,766 B1
(45) Date of Patent: *Sep. 2, 2003

(54) INTERFERENCE CANCELLER

(75) Inventors: Hiroyuki Seki, Kawasaki (JP);
Yoshinori Tanaka, Kawasaki (JP);
Shuji Kobayakawa, Kawasaki (JP);
Takeshi Toda, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/205,805

(22) Filed: Dec. 4, 1998

(30) Foreign Application Priority Data

Dec. 5, 1997 (JP) .............................. 9-335363

(51) Int. Cl.[7] .................................. H04B 7/00
(52) U.S. Cl. ....................... 370/286; 370/288; 370/342; 375/285; 375/346
(58) Field of Search ................. 370/286, 335, 370/342, 288, 289; 375/346, 148, 285, 229, 347, 267; 455/137

(56) References Cited

U.S. PATENT DOCUMENTS 5,644,592 A    7/1997  Divsalar
5,687,162 A  * 11/1997  Yoshida et al. ............. 370/203
5,694,388 A  * 12/1997  Sawahashi et al. ......... 370/206
5,748,673 A  *  5/1998  Futagi et al. ............... 375/232
5,850,415 A  * 12/1998  Hunsinger et al. .......... 375/216
6,157,685 A  * 12/2000  Tanaka et al. .............. 375/346

FOREIGN PATENT DOCUMENTS

| EP | 0 776 105 | 5/1997 |
| EP | 0 823 796 | 2/1998 |
| KR | 97 705258 | 2/1997 |
| WO | 95/24086 | 9/1995 |
| WO | 96/11534 | 4/1996 |
| WO | 96/42146 | 12/1996 |

* cited by examiner

*Primary Examiner*—Hassan Kizou
*Assistant Examiner*—Saba Tsegaye
(74) *Attorney, Agent, or Firm*—Rosenman & Colin

(57) ABSTRACT

An interference canceller includes despread processing parts, a combiner combining interference replica generation signals, a decision part that decides an output signal, spread processing parts coupled to the despread processing parts and the decision part, an attenuation coefficient generator generating an attenuation coefficient dependent on a reliability of the interference replica generation signals, and a multiplier multiplying the output signal of the decision part by the attenuation coefficient.

11 Claims, 11 Drawing Sheets

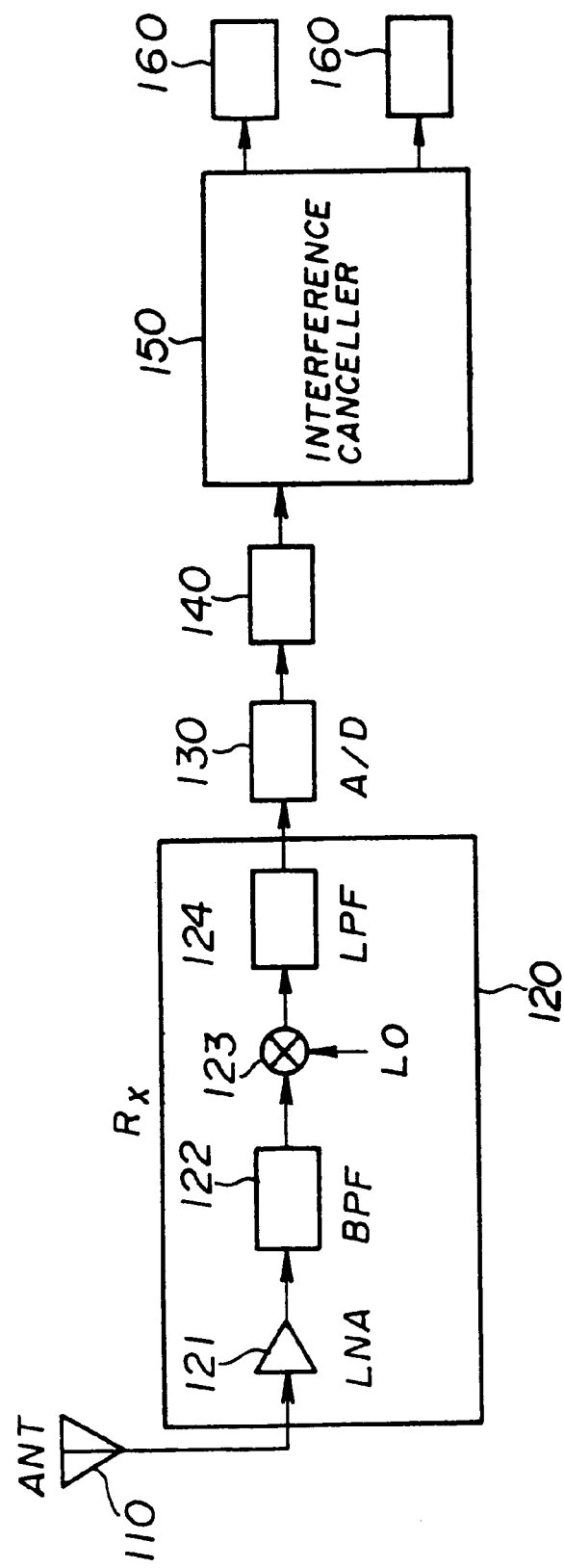

INTERFERENCE CANCELLER

BACKGROUND OF THE INVENTION

1. Field of the Invention

The present invention generally relates to an interference canceller, and more particularly to an interference canceller suitable for a cellular DS/CDMA (Direct Sequence Code Division Multiple Access) mobile communication system or the like.

In a cellular CD/CDMA mobile communication system, an interference occurs which results from an interference and noise from another mobile station due to correlation between spread codes caused by asynchronism with mobile stations. Such an interference serves as a factor which degrades the channel capacity and the transmission quality of the mobile communication system. Hence, it is desired to precisely eliminate such an interference from a received signal.

2. Description of the Related Art

FIG. 1 shows a conventional multistage type interference canceller. Each of the stages in the multistage type interference canceller is made up of interference canceller units 81 and a combiner 82. The stages thus configured are cascaded. FIG. 1 shows the multistage type interference canceller having the first stage through the mth stage. Data symbol receivers 83 are provided in the mth stage, which is the final stage.

The interference canceller units 81 and the final stage are provided in parallel for the respective users' channels. The suffix of the reference number 81 indicating the interference canceller units 81 includes a stage number and a user number corresponding to the user channel (ICU1,1, ICU1,k, ICU2,1, ICU2,k . . . ).

In the first stage, a received signal R0 is input to the interference canceller units ICU1,1–ICU1,k corresponding to the users' channels, which output interface replica signals S1,1–S1,k and interference residual signals d1,1–d1,k. The combiner 82 combines the interference residual signals d1,1–d1,k corresponding to the users' channels. The combined interference residual signals d1,1–d1,k are subtracted from the received signal R0, so that a resultant error signal e1 of the first stage is obtained.

In the second stage, the interference canceller units ICU2,1–ICU2,k are supplied with the error signal e1 from the combiner 82 of the first stage and the interference replica signals S1,l–S1,k from the interference canceller units ICU1,1–ICU1,k of the first stage. Then, the interference canceller units ICU2,1–ICU2,k respectively output interference replica signals S2,1–S2,k and interference residual signals d2,1–d2,k. The combiner 82 combines the interference residual signals d2,1–d2,k corresponding to the users' channels. The combined interference residual signals d2,1–d2,k are subtracted from the error signal e1 of the first stage. Hence, an error signal e2 of the second stage is obtained.

In the mth stage, which is the final stage, the receivers ReCm,1–ReCm,k are supplied with an error signal em-1 and interference replica signals Sm-1,1–Sm-1,k of the previous stage, and perform an interference eliminating process using the supplied signals, so that data symbols can be decoded. By sequentially repeating the interference eliminating process, the error signal is gradually reduced, and interference replica signals can be obtained from which signals interference between the users can be eliminated.

FIG. 2 shows a conventional interference canceller unit, which includes despread processing parts 91, a despreader 91-1, an adder 91-2, a multiplier 91-3, a channel estimation circuit 91-4, a combiner 92, a decision part 93, spread processing parts 94, a multiplier 94-1, an adder 94-2, a respreader 94-3, and a combiner 95.

The despread processing parts 91 and the spread processing parts 94 are respectively provided to received delayed waves, that is, multipaths. The structure shown in FIG. 2 is configured so as to handle three paths. In FIG. 2, signals corresponding to the respective paths are given a suffix "i" (In FIG. 2, i=1–3). The signals corresponding to the paths are referred to RAKE fingers.

The despread processing part 91 is supplied with the error signal ej-1 of the previous stage and the interference replica signals Sj-1,1–Sj-1,k (these signals of the first stage are zeros). The despreader 91-1 receives the error signal ej-1 from the previous stage (the received signal R0 in the first stage) and performs a despread operation thereon using the spread code. A suffice "j" indicates the stage identification number.

The adder 91-2 adds the despread signal and the interference replica signals Sj-1,2–Sj-1,k (which are zeros in the first stage), and creates a resultant receive symbol R1 of the first path. The channel estimation circuit 91-4 receives the receive symbol R1, and estimates channels of paths (the characteristics of transmission paths) using pilot symbols shown in FIG. 3B. Thus, channel estimate values $\xi i\hat{}$ are obtained for the respective paths.

The despread signal Ri is multiplied by a complex number $\xi i\hat{} {}^*$ of the channel estimate $\xi i\hat{}$ by the multiplier. Hence, a received symbol can be obtained from which a phase error due to influence of the transmission paths has been eliminated.

The output signals of the multipliers 91-3 related to the respective paths are diversity-combined (maximal ratio combining) by the combiner 92. A resulting receive symbol $\Sigma Ri\ \xi i\hat{} {}^*$ obtained by the maximal ratio combining is compared with the decision part 93, so that a data symbol can provisionally be decided.

The signals generated and output by the respread processing parts 91 are called interference replica generation signals. The interference replica generation signals are converted into interference replica signals and interference residual signals, which are then transferred to the next stage.

The provisionally decided symbol $Zs\hat{}$ output by the decision part 93 branches into signals corresponding to the paths. In each of the spread processing parts 94, the multiplier 94-1 multiplies the provisionally decided symbol $Zs\hat{}$ by the channel estimation value $\xi i\hat{}$. Hence, the provisionally decided data symbol is decomposed into the signals corresponding to the respective paths, which are output to the next stage as interference replica signals Sj,1–Sj,k.

The adders 94-2 of the spread processing parts 94 respectively add the interference replica signals Sj,i–Sj,k that are output by the multipliers 94-1 and correspond to the paths and the interference replica signals Sj-1,1–Sj-1,k supplied from the previous stage. Then, the adders 94-2 respectively output the differences between the interference replica signals Sj,i–Sj,k of this stage and the interference replica signals Sj-1,i–Sj-1,k. The output signals of the adders 94-2 of the spread processing parts 94 are spread using a spread code in the respective respreaders 94-3. The respread output signals of the respreaders 94-3 corresponding to the respective paths are combined by the combiner 95. The output signals of the combiners 95 of the interference canceller units provided for the respective users' channels are output to the combiner 82 shown in FIG. 1 as interference residual signals dj,1–dj,k.

FIG. 3A shows a conventional final-stage receiver provided in the final stage of the multistage type interference canceller, and FIG. 3B shows a frame format. The final-stage receiver labeled 100 in FIG. 3A includes despread processing parts 101, a combiner 102 and a decoder 103.

The despread processing parts 101 of the final-stage receiver 100 are supplied with the error signal em-1 from the interference replica generation unit of the previous stage and the interference replica signals Sm-1,1–Sm-1,k, and perform the same process as that of the aforementioned despread processing parts 91 of the interference canceller unit. Hence, received symbols can be obtained.

Each of the despread processing parts 101 of the final-stage receiver 100 is equipped with a despreader 91-1, an adder 91-2, a multiplier 91-3, and a channel estimation circuit 91-4, which are the same as corresponding those of the despread processing part 91 of the interference canceller unit.

The combiner 102 of the final-stage receiver 100 performs diversity combining (maximal ratio combining) of the received symbols output from the despread processing parts 101. The resultant receive symbol $\Sigma Ri\ \xi i\char`\^\ *$ obtained by the maximal ratio combining is compared with a threshold value by the decoder 103. Hence, a data symbol can be reproduced.

Referring to FIG. 3B, a pilot symbol 104 is interposed between information symbols 105, and is repeatedly transmitted by a transmitter so that it is located in a given time position. The pilot signal 104 is predetermined known data symbol, and the receive symbol received can be expressed as $Z\cdot\xi$ where Z denotes a value (complex number) of the pilot symbol 104.

Since the value of the pilot symbol 104 is known, the channel estimate circuit 91-4 multiplies the receive symbol $Z\cdot\xi$ by the complex conjugate $Z^*$ of the value Z of the pilot symbol, and thus outputs $|Z|^2\cdot\xi$. Since the magnitude (amplitude) of the pilot symbol is known (may be equal to 1: $|Z|=1$), an estimate value of the transmission path characteristic $\xi$ of the path. The aforementioned channel estimate circuit 91-4 averages the estimated transmission path characteristics $\xi$ obtained using a plurality of pilot symbols. The average value $\xi$ thus obtained is output as the channel estimate value.

FIG. 4 shows a receiver of a base station including the interference canceller. A signal received via an antenna (ANT) 110 is input to a radio part (Rx) 120, which then amplifies the received signal by means of an amplifier (LNA) 121. The amplified signal is applied to a band-pass filter (BPF) 122, which eliminates components located outside of a given band. A mixer 123 multiplies the output signal of the band-pass filter 122 by a local oscillation signal from a local oscillator LO. Thus, the received signal is converted into a signal in the base band. High-frequency components contained in the base-band signal are eliminated by a low-pass filter (LPF) 124. The output signal of the low-pass filter 124 is then output to the next stage.

An A/D converter 130 of the next stage samples the received signal from the radio part 120, and outputs a corresponding digital signal, which is applied to a path search circuit 140. The path search circuit 140 calculates delay times of the respective paths by using a plurality of delay waves received, and outputs delay time information obtained for the respective paths to an interference canceller 150.

The interference canceller 150 performs despreading for the respective paths in the interference replica generation units and the final-stage receivers on the basis of the delay time information obtained for the respective paths. Receive symbols thus obtained are output to decoders 160. Interference between the user channels (spreading codes) and interference between the paths have been eliminated from the receive symbols applied to the decoders.

Each of the decoders 160 compares the corresponding receive symbol from the interference canceller 150 with a threshold value. Thus, a data symbol can be decoded. Each of the decoders 160 shown in FIG. 4 is the same as the decoder 103 of the final-stage receiver shown in FIG. 3.

The interference canceller of the above-mentioned type, in which interference is eliminated by subtracting the interference replica signals of the users' channels from the original multiplexed receive signal, has a disadvantage in that the interference canceling performance greatly depends on the precision of the interference replica signals generated as described above.

If the interference replica signals having a poor precision are subtracted from the receive signal, interference power may be increased and the receive performance may thus be degraded. The precision of the interference replica signals may be degraded and the interference eliminating capability may be degraded if the signal is received at a relatively low level, or an excessive large number of user channels with respect to the spreading ratio is used or if the transmission paths are quickly varied (under high-speed fading environment).

SUMMARY OF THE INVENTION

An object of the present invention is to provide an interference canceller in which the above disadvantages are eliminated.

A more specific object of the present invention is to provide an interference canceller in which interference is eliminated taking into account the receive states of code-multiplexed signals of users' channels so that improved transmission quality can be obtained.

The above objects of the present invention are achieved by an interference canceller comprising: despread processing parts; a combiner combining interference replica generation signals; a decision part that decides an output signal; spread processing parts coupled to the despread processing parts and the decision part; an attenuation coefficient generator generating an attenuation coefficient dependent on a reliability of the interference replica generation signals; and a multiplier multiplying the output signal of the decision part by the attenuation coefficient.

The interference canceller may be configured so that the attenuation coefficient generator generates the attenuation coefficient which has a value dependent on a position of said interference canceller in a multi-stage formation.

The interference canceller may be configured so that the attenuation coefficient generator generates the attenuation coefficient which has a value dependent on a delay of time of a path through which a signal applied to the interference canceller is propagated.

The interference canceller may be configured so that the attenuation coefficient generator generates the attenuation coefficient which has a value dependent on a number of channels multiplexed.

The interference canceller may be configured so that the attenuation coefficient generator generates the attenuation coefficient which has a value dependent on a level of a signal applied to the interference canceller.

The interference canceller may be configured so that the attenuation coefficient generator generates the attenuation coefficient which has a value dependent on a level of a signal received through an antenna branch.

The interference canceller may be configured so that the attenuation coefficient generator generates the attenuation coefficient which has a value dependent on a level of a signal propagated through a path and applied to the interference canceller.

The interference canceller may be configured so that the attenuation coefficient generator generates the attenuation coefficient which has a value dependent on a ratio of signal power to interference/noise power.

The interference canceller may be configured so that the attenuation coefficient generator generates the attenuation coefficient which has a value dependent on at least two factors indicating a state of receiving a signal.

The interference canceller may be configured so that the attenuation coefficient generator generates the attenuation coefficient which has a value which is increased as the reliability of the interference replica generation signal is degraded.

The interference canceller may be configured so that: the interface canceller includes a plurality of stages; and each of the stages includes the despread processing parts, the combiner, the decision part, the spread processing parts, the attenuation coefficient generator and the multiplier.

BRIEF DESCRIPTION OF THE DRAWINGS

Other objects, features and advantages of the present invention will become more apparent from the following detailed description when read in conjunction with the accompanying drawings, in which:

FIG. 4 is a block diagram of a receiver of a base station including an interference canceller;

DESCRIPTION OF THE PREFERRED EMBODIMENTS

Figure 5:
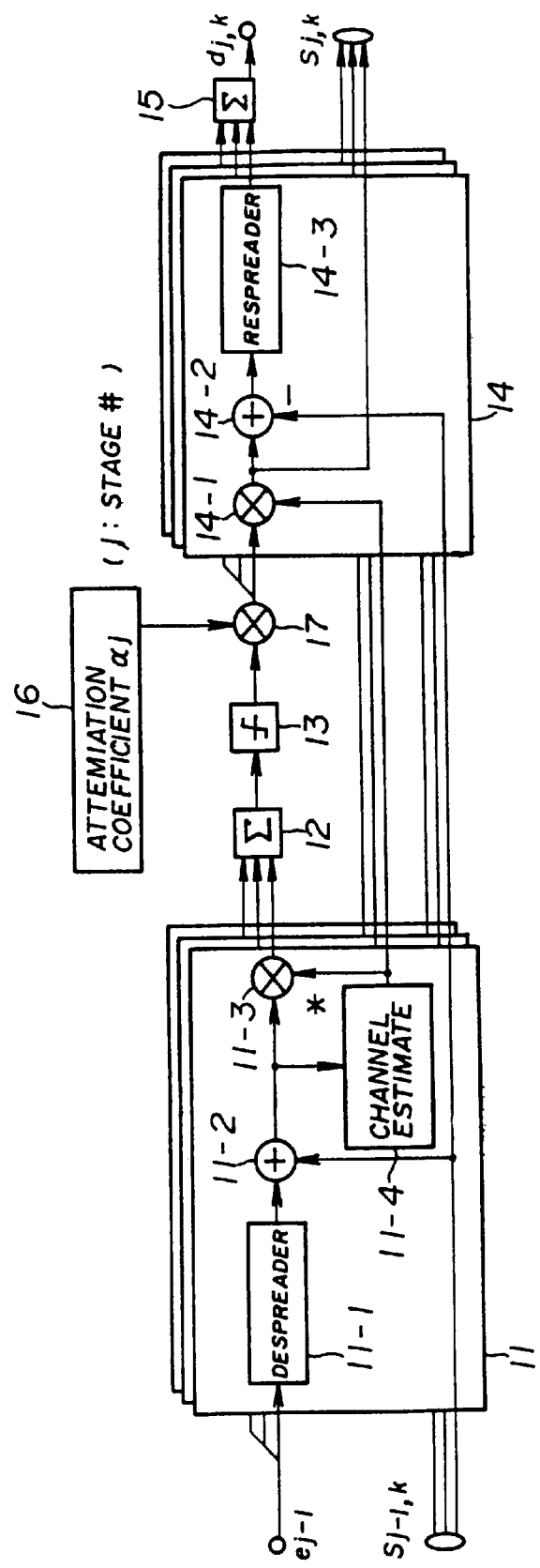
FIG. 5 is a diagram of an interference canceller unit according to a first embodiment of the present invention.

FIG. 5 shows an interference canceller unit according to a first embodiment of the present invention. The interference canceller unit shown in FIG. 5 includes despread processing parts 11, a combiner 12, a decision part 13, spread processing parts 14, a combiner 15, an attenuation coefficient generator 16, and a multiplier 17. Each of the despread processing parts 11 includes a despreader 11-1, an adder 11-2, a multiplier 11-3 and a channel estimation circuit 11-4. Each of the spread processing parts 14 includes a multiplier 14-1, an adder 14-2 and a respreader 14-3. The despread processing parts 11 and the spread processing parts 14 are equal in number to received delayed waves, that is, the number of resolvable paths.

Figure 2:
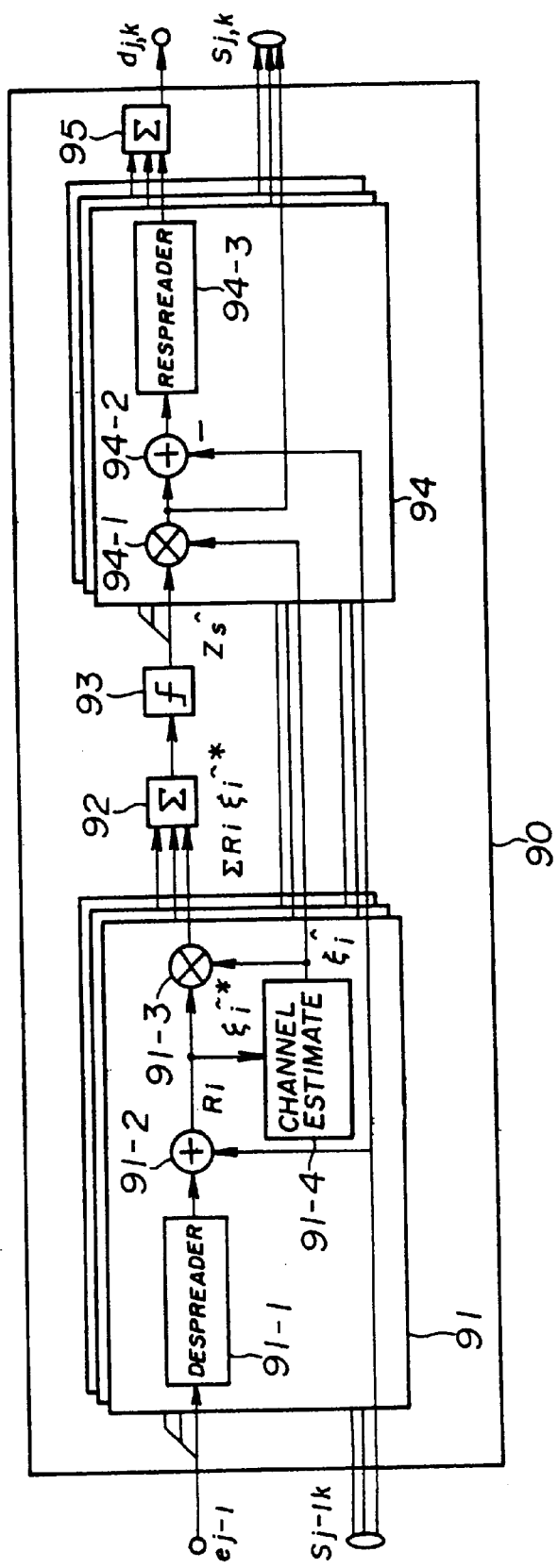
FIG. 2 is a block diagram of a conventional interference canceller unit.
Figure 3A:
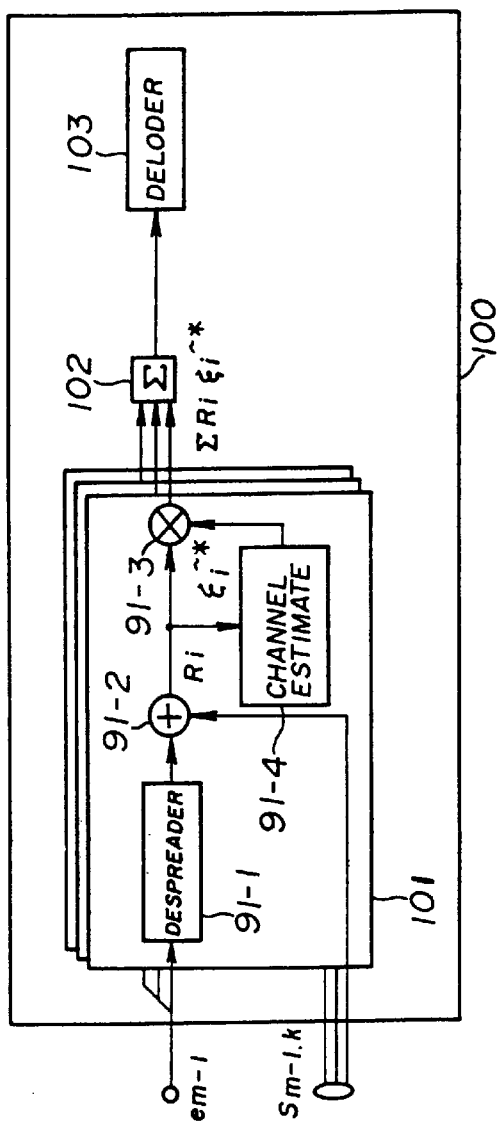
FIG. 3A is a block diagram of a conventional final-stage receiver.
Figure 3B:
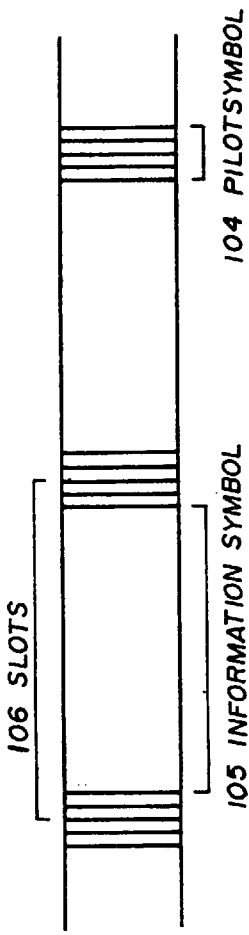
FIG. 3B is a diagram of a frame format.

The despread processing parts 11, the combiner 12, the decision part 13, the spread processing parts 14 and the combiner 15 are the same as those of the conventional interference canceller unit shown in FIG. 2, and a description thereof will be omitted.

The multistage type interference canceller repeatedly performs the interference eliminating process over a plurality of stages. Hence, the precision of the interference replica signals is gradually improved and the interference eliminating performance is thus improved.

The interference replica signals in the interference canceller unit obtained at an initial stage having a relatively small number of times that the interference eliminating process is repeatedly carried out have a comparatively low precision. As the number of times that the interference eliminating process is repeatedly carried out is increased, the interference replica signals have an improved precision.

The attenuation coefficient generator 16 is configured as follows taking into account the above. The attenuation coefficient generator 16 generates different values of the attenuation coefficient for different stages of the interference canceller. The values of the attenuation coefficient used at the initial stages function to greatly attenuate the interference replica signals. As the received signal is transferred over an increased number of stages, the attenuation coefficient has values which apply a reduced attenuation to the interference replica signals. That is, when the attenuation coefficient is denoted as $\alpha j$ (j indicates the stage number), the attenuation coefficient is set so as to have the following values:

$$0<\alpha 1<\alpha 2< \ldots <\alpha j \ldots <\alpha m<1.$$

The attenuation coefficient generator 16 generates the attenuation coefficient having the different values for the different stages of the interference canceller and applies it to the multiplier 17. Then, the multiplier 17 multiplies the interference replica signal output by the decision circuit 13 by the attenuation coefficient. Hence, the interference replica signal is attenuated, in each of the spread processing parts 14, by the attenuation coefficient having the value corresponding to the present stage. Hence, it is possible to suppress the influence of the interference replica signals having a comparatively low precision with respect to the interference eliminating process. The attenuation coefficient is multiplied. Hence, as the attenuation coefficient has a smaller value, the degree of attenuation of the interference replica signal is increased.

Figure 6:
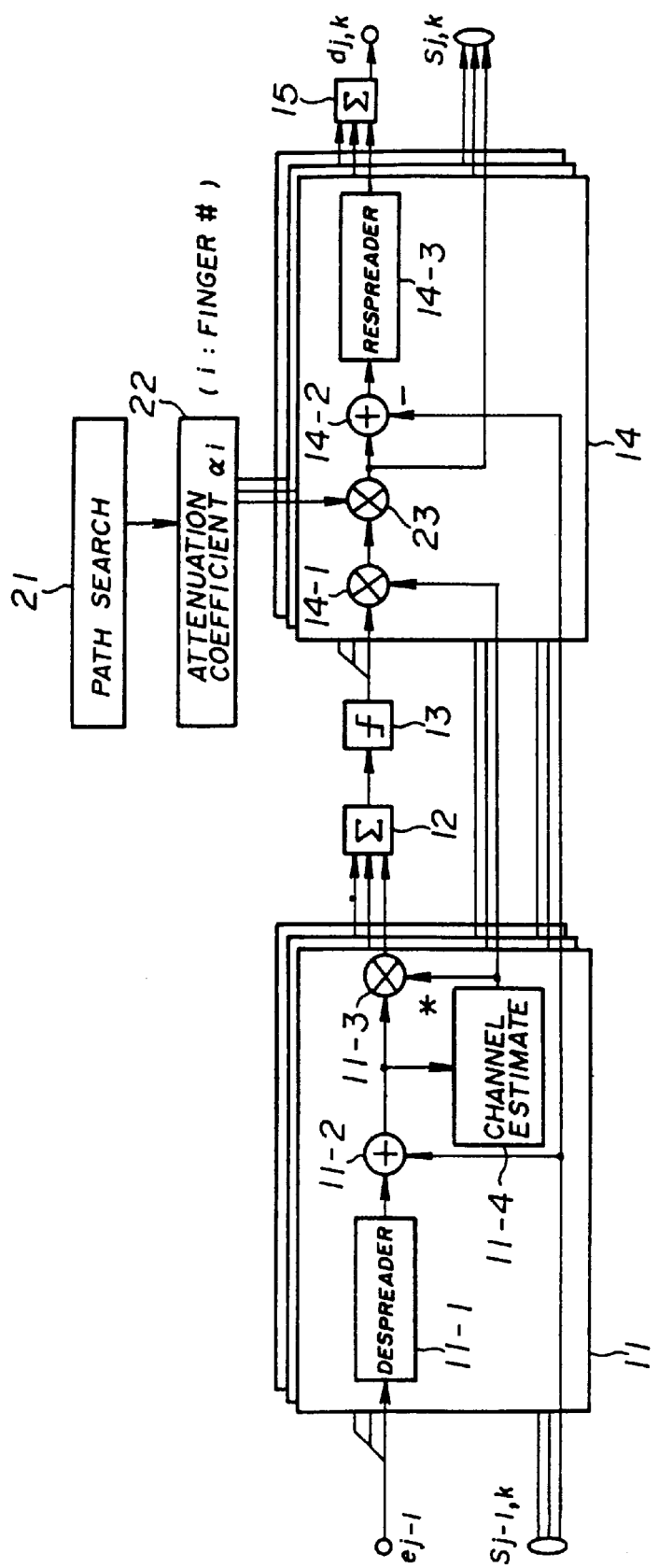
FIG. 6 is a diagram of an interference canceller unit according to a second embodiment of the present invention.

FIG. 6 shows an interference canceller unit according to a second embodiment of the present invention. In FIG. 6, parts that are the same as those shown in FIG. 5 are given the same reference numbers and a repetitive description thereof will be omitted.

The interference canceller unit shown in FIG. 6 includes a path search circuit 21, an attenuation coefficient generator 22, and a multiplier 23. The path search circuit 21 is the same as the path search circuit 140 in the receiver of the base station equipped with the interference canceller. That is, the path search circuit 21 calculates the delay times for the respective paths from the delayed waves received in multiple formation, and outputs delay time information on the respective paths.

In a general multi-path environment, a path having a large delay has not only a distance attenuation but also reflection and diffraction that take place a plurality of numbers of times. Hence the signal propagated through such a path and then received has a comparatively low received level. Hence, generally, the interference replica having a comparatively large delay of time has a low reliability.

With the above in mind, the attenuation coefficient generator 22 shown in FIG. 6 generates the attenuation coefficient having values dependent on the delays of time by referring to the delay time information on the paths output by the path search circuit 21. More particularly, the greater the delay time, the smaller the value of the attenuation coefficient $\alpha i$.

The multiplier 23 multiplies the interference replica generation signal outputs from the multipliers 14-1 of the spread processing parts 14 corresponding to the respective paths (fingers) by the attenuation coefficient. Hence, the levels of the interference replica signals are attenuated based on the delays of time of the respective paths. Hence, it is possible to suppress the interference replica signals having a low reliability with respect to the interference eliminating process.

Figure 7:
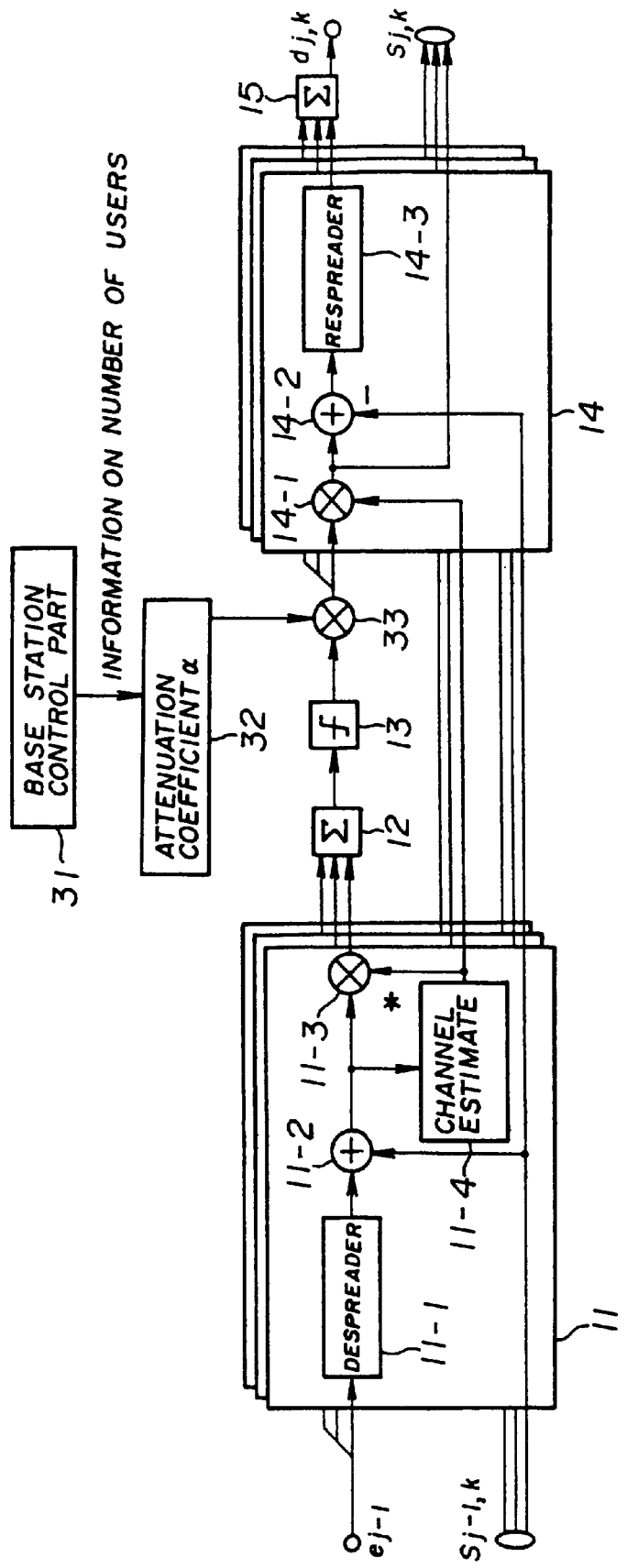
FIG. 7 is a diagram of an interference canceller unit according to a third embodiment of the present invention.

FIG. 7 shows an interference canceller unit according to a third embodiment of the present invention. In FIG. 7, parts that are the same as those shown in FIG. 5 are given the same reference numbers, and a repetitive description thereof will be omitted.

The interference canceller unit shown in FIG. 7 includes a base station controller 31, and an attenuation coefficient generator 32. As the number of multiple users' channels is increased, the level of interference between the spreading codes is increased. Thus, the reliability of the reference replicas is degraded. The third embodiment of the present invention is directed to using the different values of the attenuation coefficient dependent on the number of multiple users' channels.

The base station controller 31 holds information indicating the number of users' channels which are in use for communications. The above information is supplied to the attenuation coefficient generator 32 from the base station controller 31. Then, the attenuation coefficient generator 32 determines the value of the attenuation coefficient based on the number of users' channels which are in use for communications. More particularly, as the number of users' channels is increased, the value of the attenuation coefficient $\alpha$ is reduced.

The multiplier 33 multiplies the interference replica generation signal output by the decision part 13 by the attenuation coefficient $\alpha$ having the value based on the number of users' channels which are in use for communication. Hence, the level of the interference replica generation signal is attenuated based on the number of users' channels which are in use for communication. Hence, it is possible to suppress the influence of the interference replica signals having a low reliability with respect to the interference eliminating process.

Figure 8:
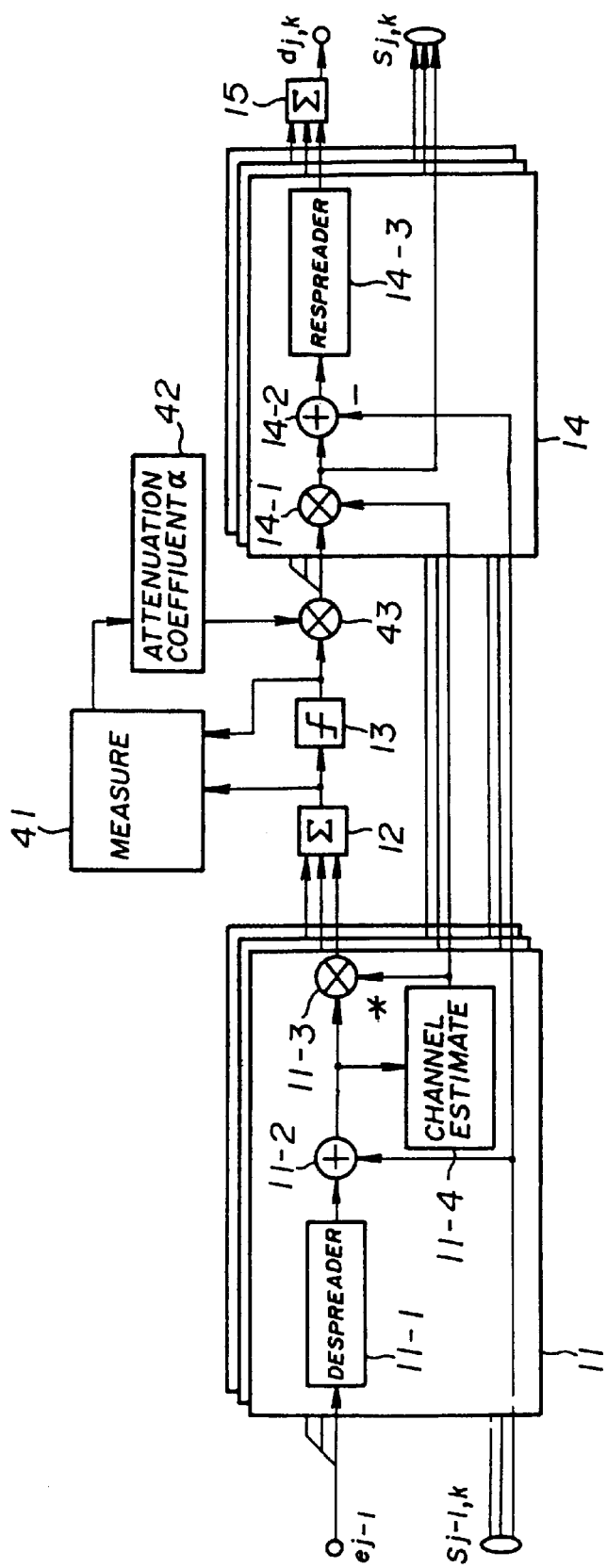
FIG. 8 is a diagram of an interference canceller unit according to a fourth embodiment of the present invention.

FIG. 8 shows an interference canceller unit according to a fourth embodiment of the present invention. In FIG. 8, parts that are the same as those of the interference canceller unit according to the first embodiment of the present invention are given the same reference numbers, and a repetitive description thereof will be omitted.

The interference canceller unit shown in FIG. 8 includes a measurement circuit 41, and an attenuation coefficient generator 42. The measurement circuit 41 measures a signal level or a ratio of signal power to interference/noise power (SIR). The measurement circuit 41 measures the average level of the output signal of the combiner 12 which combines the signal levels obtained after the demodulation by the despread processing parts 11, and outputs the measured average level to the attenuation coefficient generator 42. Then, the attenuation coefficient generator 42 generates the attenuation coefficient having a value dependent on the signal level. More particularly, the lower the signal level, the smaller the value of the attenuation coefficient $\alpha$.

The multiplier 43 multiplies the interference replica generation signal output from the decision part 13 by the attenuation coefficient $\alpha$ having the value dependent on the signal level. Thus, the level of the interference replica generation signal is attenuated based on the signal level. It is hence possible to suppress the influence of the interference replica signal having a low reliability with respect to the interference eliminating process.

The measurement circuit measures the signal level obtained after the demodulation by the despread processing parts 11. Alternatively, the following can be employed. The SIR is obtained from the signal level and the output signal level of the decision part 13. The SIR is applied to the attenuation coefficient generator 42, which outputs the attenuation coefficient based on the received SIR.

In this case, the lower the SIR, the smaller the attenuation coefficient $\alpha$. By attenuating the level of the interference replica generation signal on the basis of the SIR, it is possible to suppress the influence of the interference replica signal having a low reliability with respect to the interference eliminating process.

Figure 9:
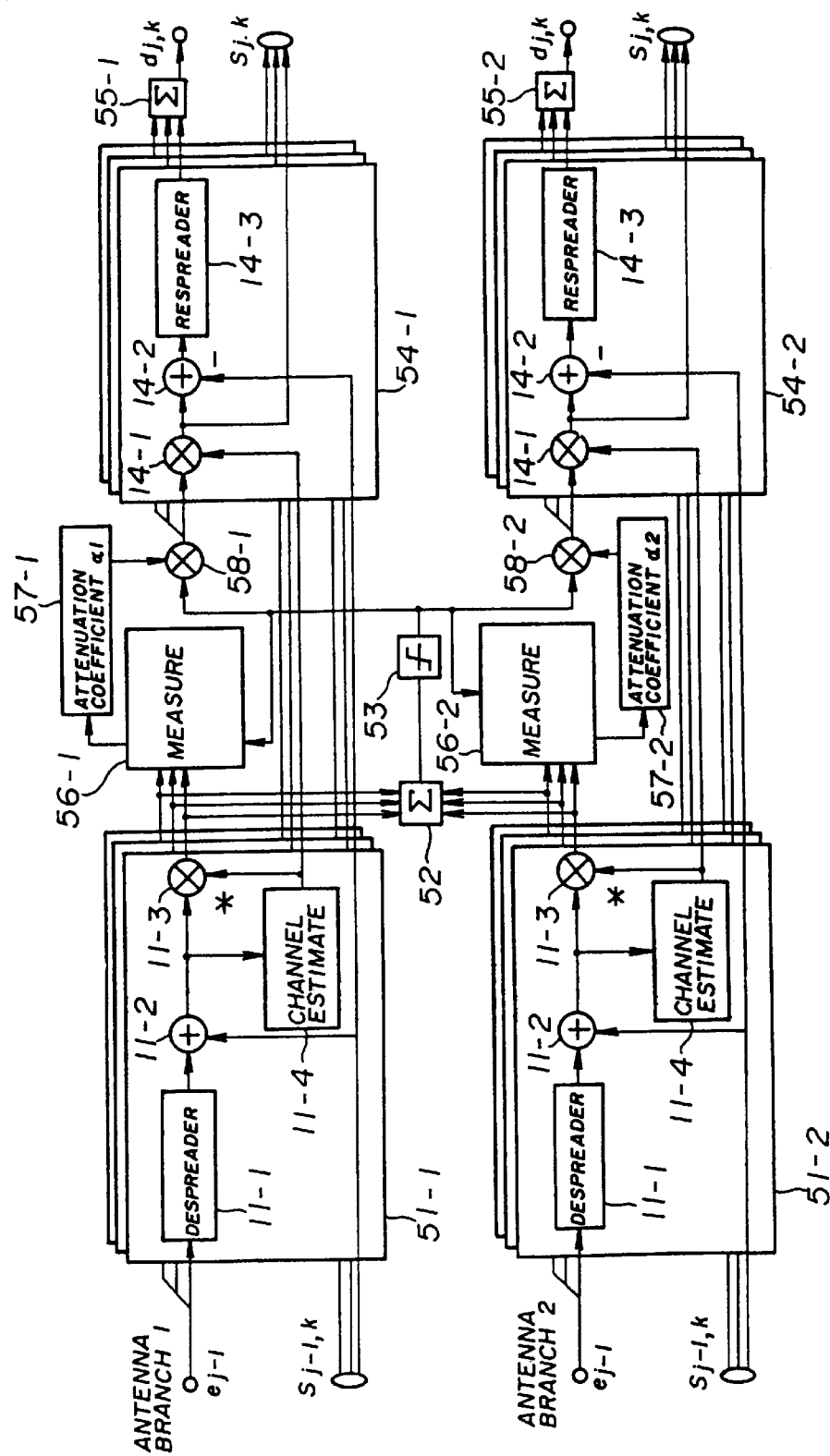
FIG. 9 is a diagram of an interference canceller unit according to a fifth embodiment of the present invention.

FIG. 9 shows an interference canceller unit according to a fifth embodiment of the present invention. The unit shown in FIG. 9 includes despread processing parts 51-1 and 51-2, a combiner 52, a decision part 53, spread processing parts 54-1 and 54-2, combiners 55-1 and 55-2, measurement circuits 56-1 and 56-2 that measure the signal level or the SIR, attenuation coefficient generators 57-1 and 57-2, and multipliers 58-1 and 58-2.

The despread processing parts 51-1 and 51-2 and the spread processing parts 54-1 and 54-2 have the same configurations as those of the despread processing parts 11 and the spread processing parts 14 of the interference canceller unit according to the first embodiment of the present invention.

FIG. 9 shows a structure of the interference canceller unit used when an antenna diversity is employed. The structure shown in FIG. 9 has two antenna branches 1 and 2. The measurement parts 56-1 and 56-2 are respectively provided to the antenna branches 1 and 2, and measure the signal levels or the SIRs after the demodulation processes by the despread processing parts 51-1 and 51-2 are carried out. The signal levels of the SIRs respectively obtained for the antenna branches 1 and 2 are input to the attenuation coefficient generators 57-1 and 57-2.

The attenuation coefficient generators 57-1 and 57-2 respectively generate different attenuation coefficients $\alpha 1$ and $\alpha 2$ on the basis of the signal levels or the SIRs. More particularly, as the signal levels or the SIRs become lower, the attenuation coefficients $\alpha 1$ and $\alpha 2$ are set to smaller values.

The multipliers 58-1 and 58-2 respectively provided to the antenna branches 1 and 2 multiply the interference replica generation signal output by the decision part 53 by the attenuation coefficients α1 and α2 supplied from the attenuation coefficient generators 57-1 and 57-2. Hence, the levels of the interference replica generation signals are attenuated based on the signal levels or the SIRs respectively obtained for the antenna branches 1 and 2. Hence, it is possible to suppress the influence of the interference replica signal having a low reliability with respect to the interference eliminating process.

Figure 10:
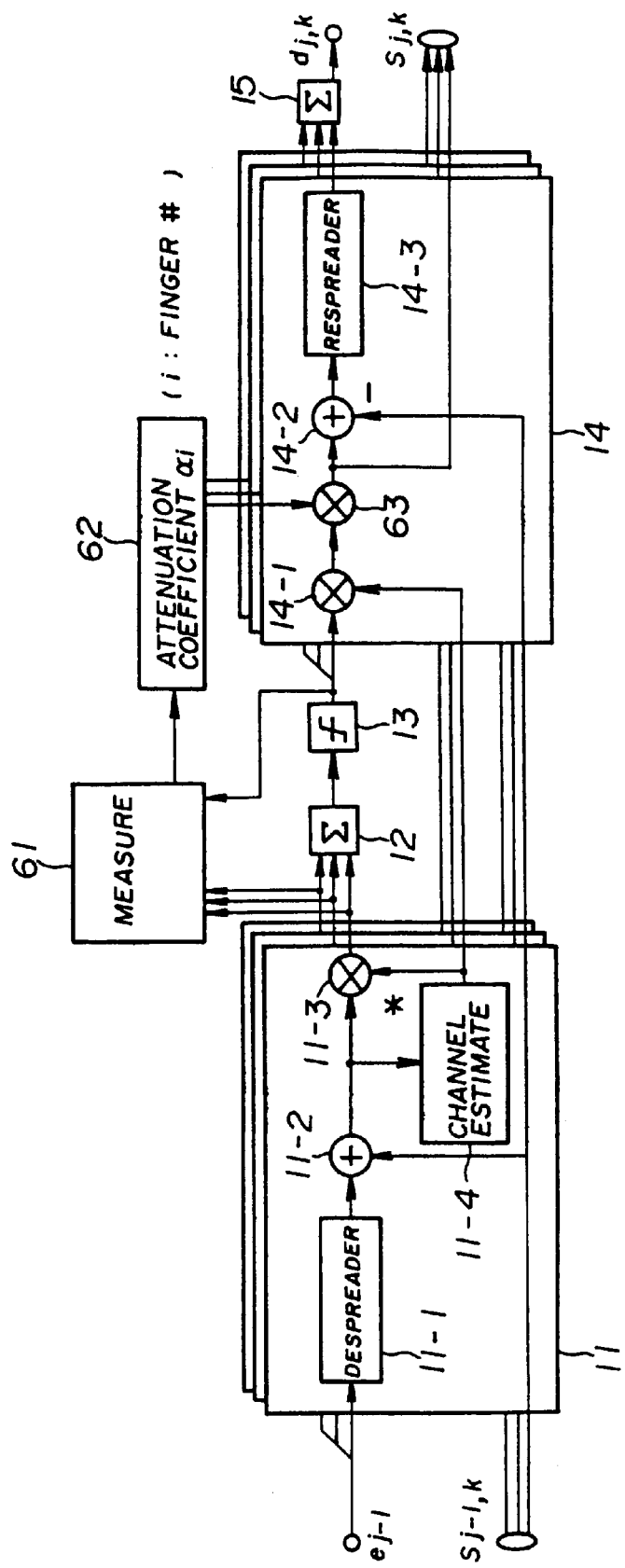
FIG. 10 is a diagram of an interference canceller unit according to a sixth embodiment of the present invention.

FIG. 10 shows an interference canceller unit according to a sixth embodiment of the present invention. In FIG. 10, parts that are the same as those of the interference canceller unit according to the first embodiment of the present invention are given the same reference numbers, and a repetitive description thereof will be omitted.

The unit shown in FIG. 6 includes a measurement circuit 61 which measures a signal level or an SIR, an attenuation coefficient generator 62, and a multiplier 63. The measurement circuit 61 measures the signal levels or the SIRs obtained after the demodulation processes carried out by the despread processing parts 11 provided to the respective paths (fingers). The measured values obtained for the respective paths are applied to the attenuation coefficient generator 62. Then, the attenuation coefficient generator 62 generates the attenuation coefficients αi based on the signal levels or the SIRs respectively obtained for the paths (fingers). As the signal levels or the SIRs are lower, the values of the coefficients αi are smaller.

The multipliers 63 of the spread processing units 14 multiply the interference replica generation signals from the multipliers 14-1 thereof by the attenuation coefficients αi having the values based on the signal levels or the SIRs obtained for the respective paths (fingers). Hence, the levels of the interference replica generation signals are attenuated based on the signal levels or the SIRs respectively obtained for the paths (fingers). Hence, it is possible to suppress the influence of the interference replica signal having a low reliability with respect to the interference eliminating process.

Figure 11:
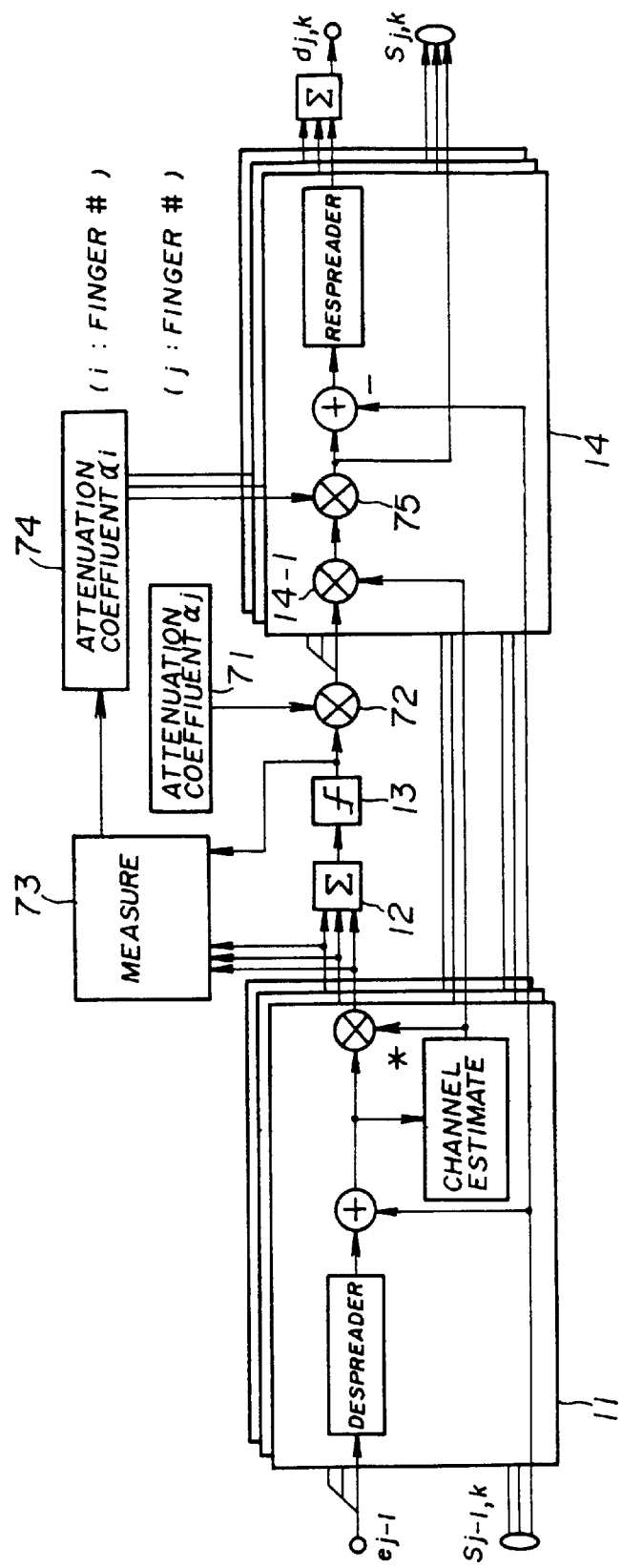
FIG. 11 is a diagram of an interference canceller unit according to a seventh embodiment of the present invention.

FIG. 11 shows an interference canceller unit according to a seventh embodiment of the present invention. In FIG. 11, parts that are the same as those of the interference canceller unit according to the first embodiment of the present invention are given the same reference numbers, and a repetitive description thereof will be omitted.

The unit shown in FIG. 11 includes a first attenuation coefficient generator 71 and multipliers 72, and includes a second attenuation coefficient generator 74, a multiplier 75 and a measurement circuit 73 which measures signal levels or SIRs after the demodulation, provided in the respective spread processing parts 14.

The interference canceller unit according to the seventh embodiment corresponds to a combination of the first-embodiment unit shown in FIG. 5 and the attenuation means employed in the sixth-embodiment unit shown in FIG. 10.

The first attenuation coefficient generator 71 generates attenuation coefficients αj for the respective stages. The multiplier 72 multiplies the interference replica generation signal from the decision part 13 by the attenuation coefficient of the present stage generated by the attenuation coefficient generator 71. Hence, it Is possible to attenuate the interference replica generation signal having a low reliability.

The measurement circuit 73 measures the signal levels or the SIRs of the respective paths (fingers) obtained after the demodulation by the despread processing parts 11. The attenuation coefficient generator 74 generates the attenuation coefficients depending on the measured signal levels or SIRs obtained for the respective paths (fingers). The multipliers 75 multiply the interference replica generation signals by the attenuation coefficients depending on the signal levels or the SIRs respectively obtained for the paths. Hence, the level of the interference replica generation signal having a low signal level or SIR can be attenuated for each path (finger).

Thus it is possible to suppress, in each stage, the influence of the interference replica signal having a low reliability on the basis of the signal levels or the SIR.

It is possible to arbitrarily combine the means for attenuating the interference replica signals having a low reliability employed in the first through sixth embodiments of the present invention and to thus improve the reliability of the interference canceller.

Figure 1:
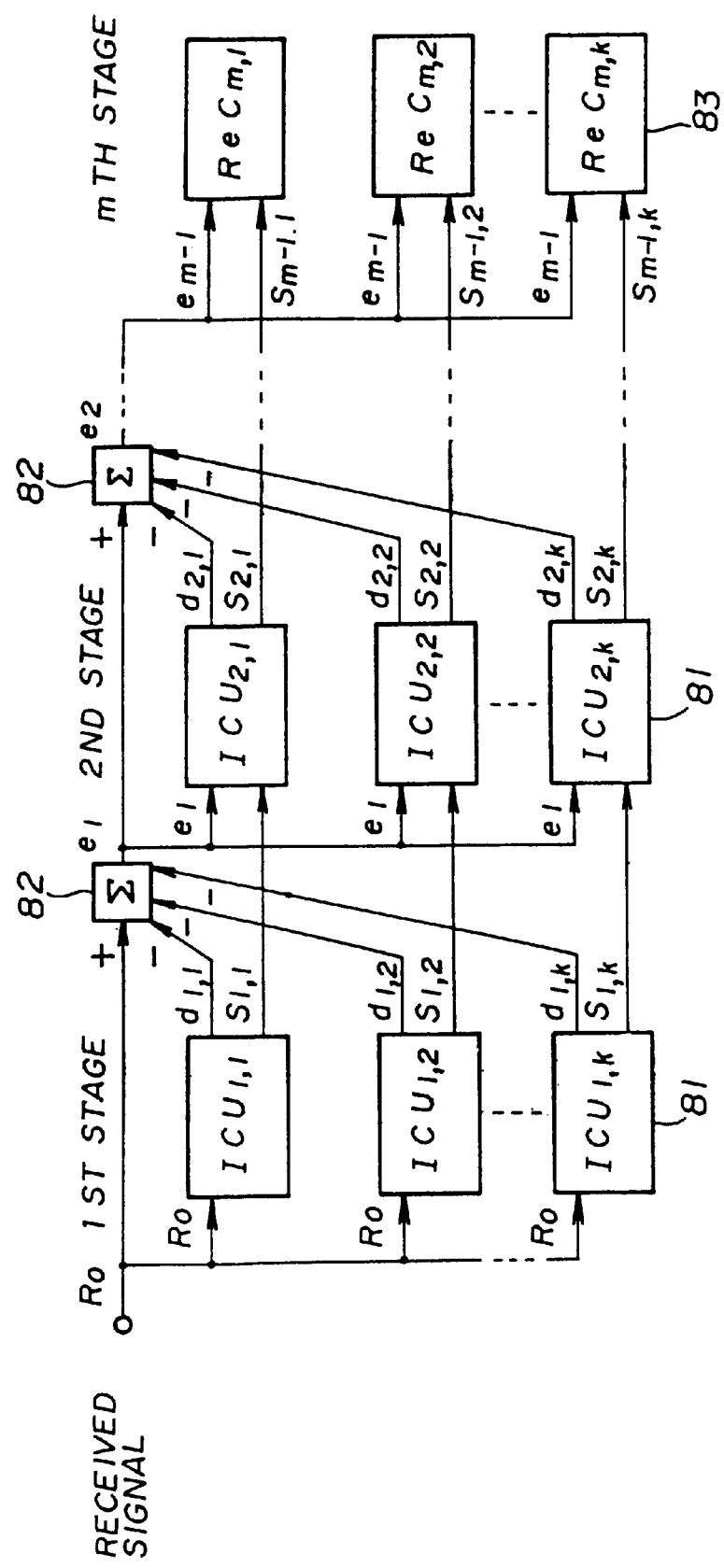
FIG. 1 is a block diagram of a conventional multistage type interference canceller.

The present invention includes not only the parallel type shown in FIG. 1 in which the multiple users' channels are processed in parallel formation but also other types. For example, the present invention includes a serial type in which the multiple users' channels are processed in serial formation, a single-stage type and a multiple-stage type.

The present invention also includes a hard-decision (nonlinear) type interference canceller in which a decision on the received symbol is made to obtain an estimate symbol irrespective of the amplitude of the received symbol, and a soft-decision (linear) type interference canceller in which a decision holding the amplitude of the received signal is made.

As described above, according to the present invention, the interference replica signals generated by the interference canceller unit are controlled using at least one of the attenuation coefficients dependent on the stage, the delays of time of paths, the number of users' channels, the levels of the received signals, and the SIRs. Hence, the degree of attenuation of the interference replica signals having a relatively low reliability is increased (the value of the attenuation coefficient is decreased). Hence, it is possible to optimally eliminate interference on the basis of the receive states of the users' channels which are code-multiplexed and to thus improve the transmission quality.

The present invention is not limited to the specifically disclosed embodiments, and variations and modifications may be made without departing from the scope of the present invention.

What is claimed is:

1. An interference canceller comprising:

despread processing parts;

a combiner combining interference replica generation signals;

a decision part that decides an output signal;

spread processing parts coupled to the despread processing parts and the decision part;

an attenuation coefficient generator generating an attenuation coefficient dependent on a reliability of the interference replica generation signals; and a multiplier multiplying the output signal of the decision part by the attenuation coefficient.

2. The interference canceller as claimed in claim 1, wherein the attenuation coefficient generator generates the attenuation coefficient which has a value dependent on a position of said interference canceller in a multi-stage formation.

3. The interference canceller as claimed in claim 1, wherein the attenuation coefficient generator generates the attenuation coefficient which has a value dependent on a delay of time of a path through which a signal applied to the interference canceller is propagated.

4. The interference canceller as claimed in claim 1, wherein the attenuation coefficient generator generates the attenuation coefficient which has a value dependent on a number of channels multiplexed.

5. The interference canceller as claimed in claim 1, wherein the attenuation coefficient generator generates the attenuation coefficient which has a value dependent on a level of a signal applied to the interference canceller.

6. The interference canceller as claimed in claim 1, wherein the attenuation coefficient generator generates the attenuation coefficient which has a value dependent on a level of a signal received through an antenna branch.

7. The interference canceller as claimed in claim 1, wherein the attenuation coefficient generator generates the attenuation coefficient which has a value dependent on a level of a signal propagated through a path and applied to the interference canceller.

8. The interference canceller as claimed in claim 1, wherein the attenuation coefficient generator generates the attenuation coefficient which has a value dependent on a ratio of signal power to interference/noise power.

9. The interference canceller as claimed in claim 1, wherein the attenuation coefficient generator generates the attenuation coefficient which has a value dependent on at least two factors indicating a state of receiving a signal.

10. The interference canceller as claimed in claim 1, wherein the attenuation coefficient generator generates the attenuation coefficient which has a value which is increased as the reliability of the interference replica generation signal is improved.

11. The interference canceller as claimed in claim 1, wherein:

the interference canceller includes a plurality of stages; and each of the stages includes the despread processing parts, the combiner, the decision part, the spread processing parts, the attenuation coefficient generator and the multiplier.

* * * * *